No. 612,660. Patented Oct. 18, 1898.
A. W. BROWNE.
HEAD REST FOR DENTAL CHAIRS.
(Application filed Apr. 23, 1898.)
(No Model.) 5 Sheets—Sheet 1.

WITNESSES: INVENTOR:
Theodore B. Vaill Arthur W. Browne,
Robinson L. Vaill By Edw. F. Simpson, Jr.
Attorney.

No. 612,660. Patented Oct. 18, 1898.
A. W. BROWNE.
HEAD REST FOR DENTAL CHAIRS.
(Application filed Apr. 23, 1898.)

(No Model.) 5 Sheets—Sheet 2.

WITNESSES: INVENTOR:
Theodore D. Vail Arthur W. Browne,
Robinson D. Vail by Edw. F. Simpson, Jr.
Attorney.

THE NORRIS PETERS CO., PHOTO-LITHO., WASHINGTON, D. C.

No. 612,660. Patented Oct. 18, 1898.
A. W. BROWNE.
HEAD REST FOR DENTAL CHAIRS.
(Application filed Apr. 23, 1898.)

(No Model.) 5 Sheets—Sheet 3.

WITNESSES: INVENTOR:

No. 612,660. Patented Oct. 18, 1898.
A. W. BROWNE.
HEAD REST FOR DENTAL CHAIRS.
(Application filed Apr. 23, 1898.)

(No Model.)  5 Sheets—Sheet 4.

WITNESSES:
Theodore B Vaill.
Robinson L Vaill

INVENTOR:
Arthur W. Browne,
by Edw. F. Simpson, Jr.
Attorney.

THE NORRIS PETERS CO., PHOTO-LITHO., WASHINGTON, D. C.

No. 612,660. Patented Oct. 18, 1898.
A. W. BROWNE.
HEAD REST FOR DENTAL CHAIRS.
(Application filed Apr. 23, 1898.)
(No Model.) 5 Sheets—Sheet 5.
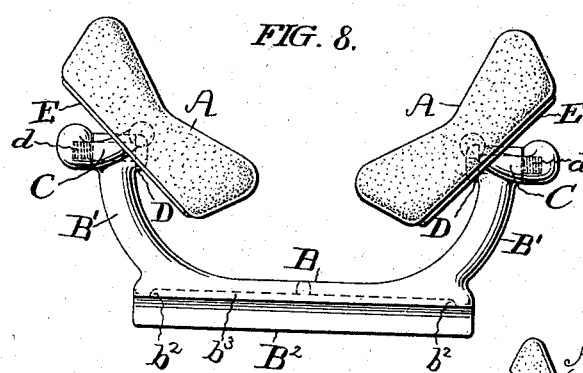
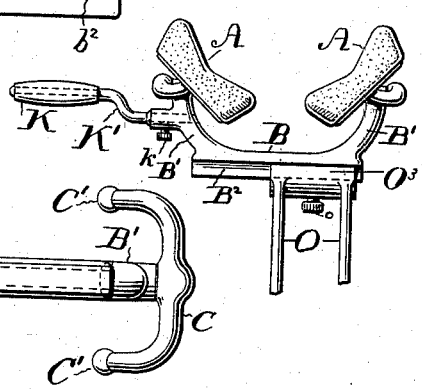
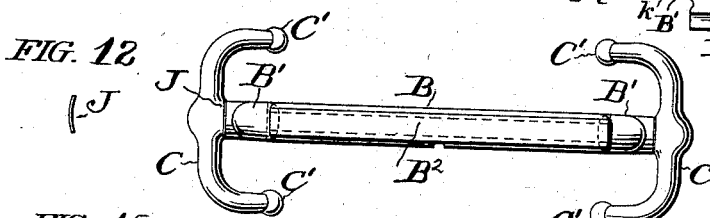
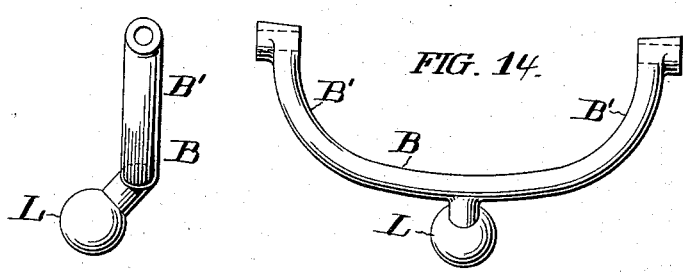
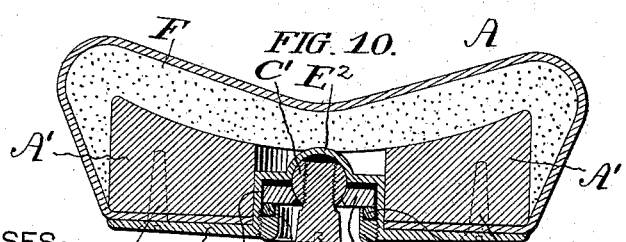
WITNESSES: INVENTOR:
Theodore B. Vaill Arthur W. Browne,
Robinson L. Vaill by Edw. F. Simpson, Jr.
Attorney.
THE NORRIS PETERS CO., PHOTO-LITHO., WASHINGTON, D. C.

UNITED STATES PATENT OFFICE.

ARTHUR W. BROWNE, OF NEW YORK, N. Y., ASSIGNOR TO THE S. S. WHITE DENTAL MANUFACTURING COMPANY, OF PHILADELPHIA, PENNSYLVANIA.

HEAD-REST FOR DENTAL CHAIRS.

SPECIFICATION forming part of Letters Patent No. 612,660, dated October 18, 1898.

Application filed April 23, 1898. Serial No. 678,551. (No model.)

*To all whom it may concern:*

Be it known that I, ARTHUR W. BROWNE, a citizen of the United States, residing at New York, (Prince's Bay,) in the county of Richmond and State of New York, have invented certain new and useful Improvements in Head-Rests; and I do hereby declare the following to be a full, clear, and exact description of the invention, such as will enable others skilled in the art to which it appertains to make and use the same.

My invention relates to head-rests for dental chairs; and it consists in certain improvements in head-rests proper and also in supports for the same.

The object of the invention is to provide a head-rest that is self-adjusting and comfortable to patients, and also to provide a head-rest support that is susceptible of a very wide range of adjustment and that can be quickly and easily adjusted and firmly locked in position.

My improvements will first be described in detail and then specifically pointed out in the claims.

Figure 1:
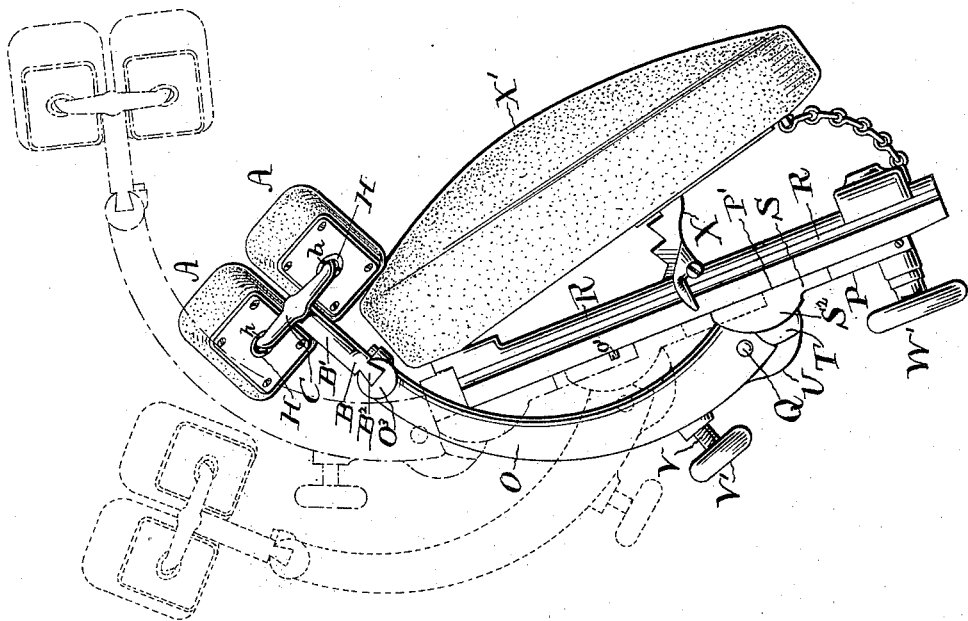
Figure 2:
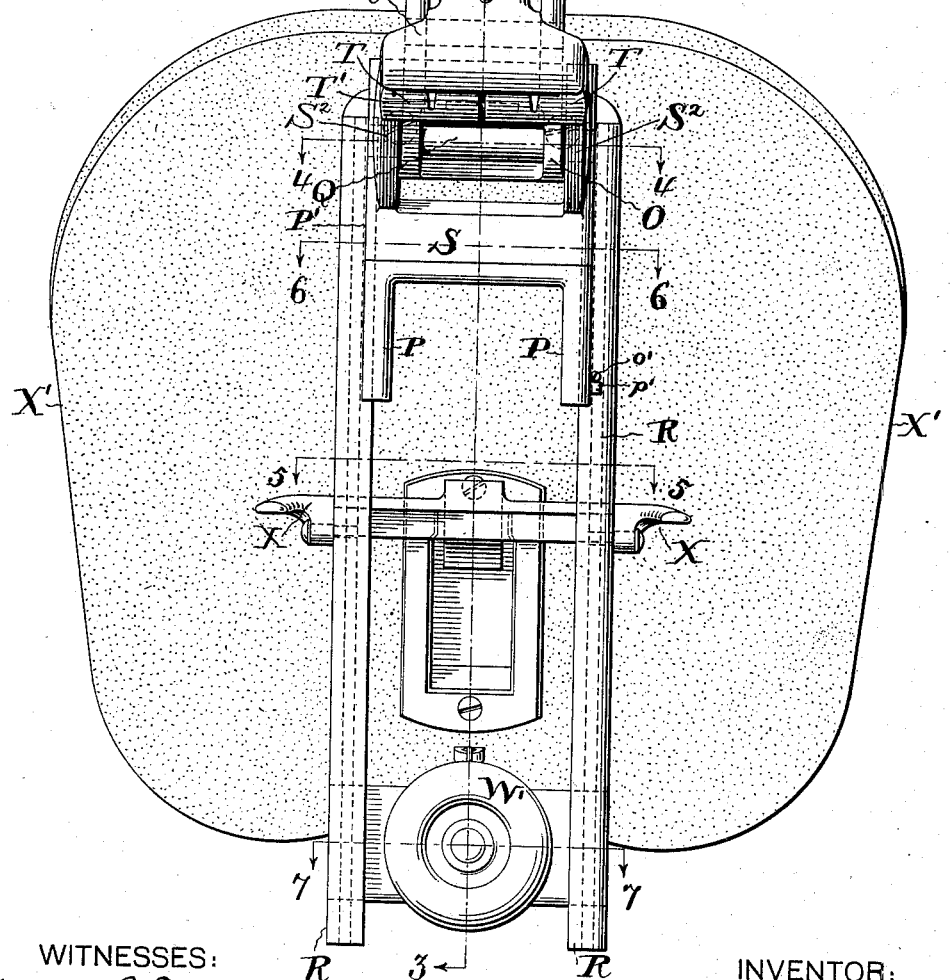
Figure 3:
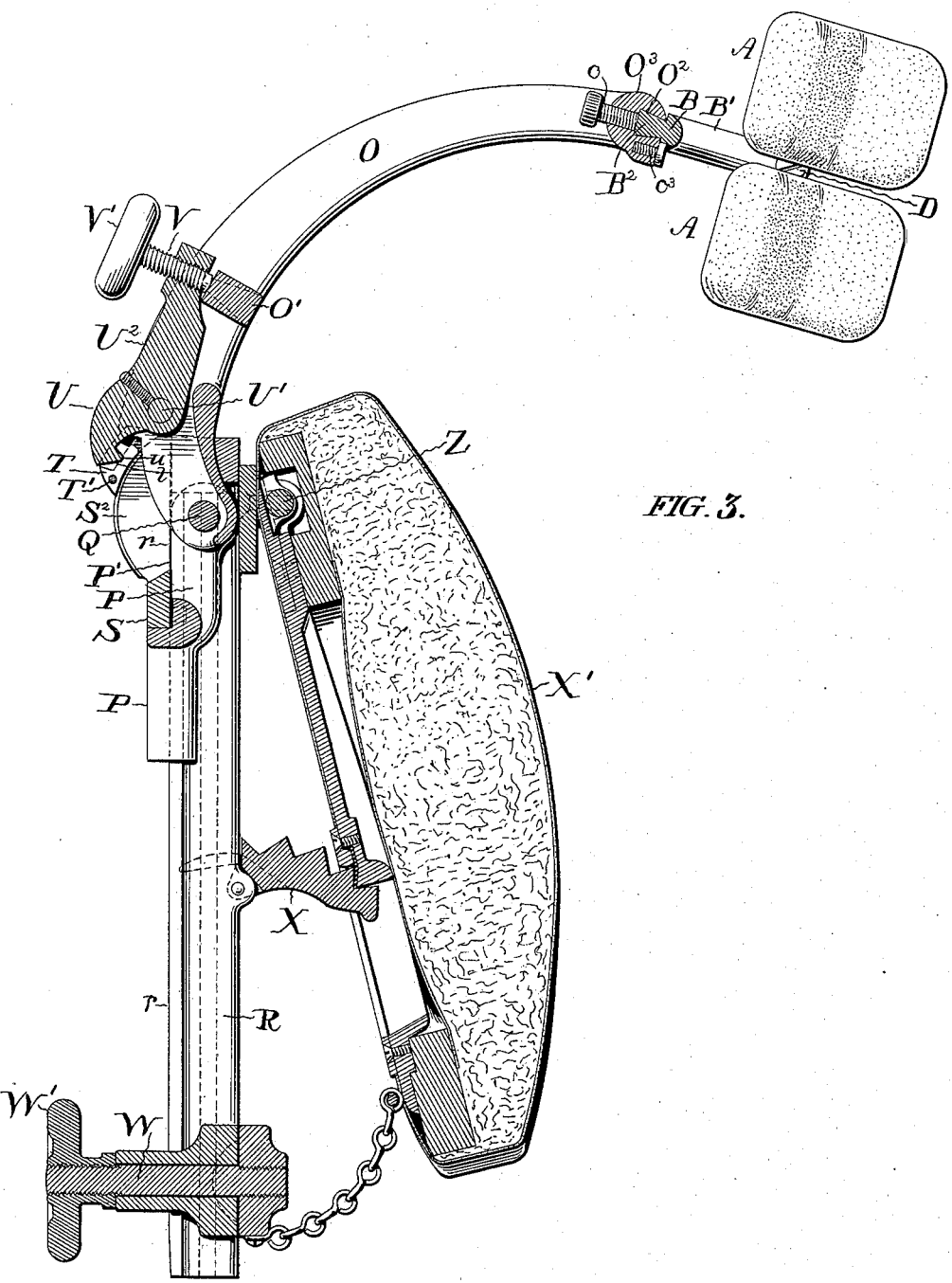
Figure 4:
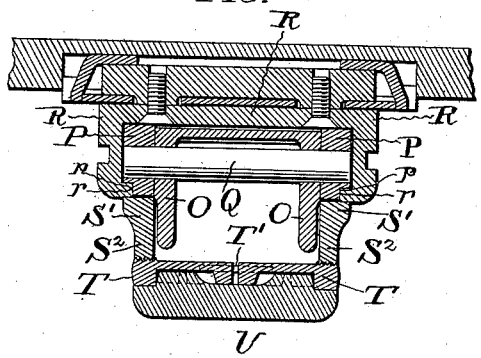
Figure 5:
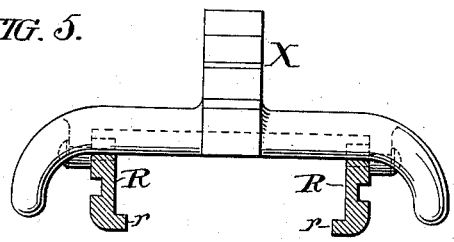
Figure 6:
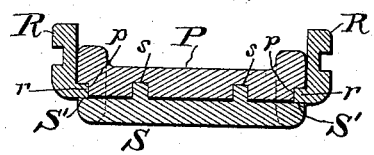
Figure 7:
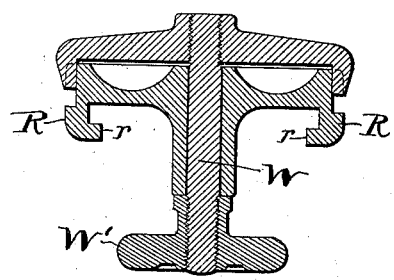

In the accompanying drawings, in which similar letters refer to similar parts throughout the several views, Figure 1 is a view in side elevation of the back of a dental chair having attached thereto a head-rest and its support constructed in accordance with my invention. Fig. 2 is a rear or back view of the parts shown in Fig. 1, on an enlarged scale as compared with said Fig. 1. Fig. 3 is a vertical central sectional view on the line 3 3 of Fig. 2. Figs. 4, 5, 6, and 7 are horizontal sectional views on the lines 4 4, 5 5, 6 6, and 7 7, respectively, of Fig. 2. Fig. 8 is a view in rear elevation of the head-rest proper detached. Fig. 9 is a bottom or inverted plan view of the head-rest-supporting bar detached and the head-rest pads removed. Fig. 10 is a longitudinal central section through one of the head-rest pads. Fig. 11 is a sectional view of one of the spring-rings used in the head-rest pads. Fig. 12 is a side view of a similar ring used upon the head-rest-supporting bar. Fig. 13 is a view, on a reduced scale, of a head-rest provided with an arm-rest. Fig. 14 is a view in rear elevation, and Fig. 15 a view in side elevation, of a head-rest-supporting bar of modified form.

I will first describe the improved head-rest proper and afterward the support for the same.

The head-rest proper consists of four pads A A A A, mounted upon a supporting-bar B, carried at the upper end of a supporting-arm O, forming part of the head-rest support, which will be hereinafter more fully described. The supporting-bar B is provided with two similar arms or branches B' B', projecting upwardly or inwardly from its opposite ends. To the extremity of each arm or branch B' of the supporting-bar there is pivoted a carrier C for the head-rest pads. Each carrier is pivoted centrally or midway its length to one branch of the supporting-bar, the pivot preferably consisting of a screw-bolt D, tapped at *d* in a socket in the carrier and turning in an opening in the upper end of the branch of the supporting-bar. The carriers C C are exact duplicates of each other, and their pivotal connections with the supporting-bar are in alinement, whereby the carriers are adapted to be turned about a common axis, which, it should be observed, is parallel with the longitudinal axis of said supporting-bar. The carriers are each bent or curved on opposite sides of their pivotal connection with the supporting-bar to bring their opposite ends inward or toward the ends of the other carrier and substantially parallel with each other and also with said pivotal connection. A bent or spring washer J is preferably interposed between each carrier and the branch of the supporting-bar to which it is connected for the purpose of exerting frictional tension upon the carriers, whereby they may be yieldingly supported in any position to which they may be turned. A pair of the four head-rest pads A A A A is mounted upon each of the carriers, one pad being pivoted on one of the four ends of the two carriers by means of universal joints. The universal connection between each pad and its carrier is shown as consisting of a ball-and-socket joint, preferably constructed as follows:

Each pad is composed of a wood block A', (see Fig. 10,) to the back of which is attached a metal base-plate E by means of screws $e$, the pad being provided with the usual upholstery F. The base-plate E is formed with a central depressed cylindrical portion E', which fits in an opening in the wood block, and centrally located in the bottom of the depressed portion of the base-plate is a semispherical socket $E^2$, in which is seated a ball C' on the extremity of that end of the carrier C to which the pad is connected. The socket in which the ball C' is seated is completed by a cone-piece G, loosely fitted in the depressed portion of the base-plate and surrounding the ball C'. A cylindrical adjusting-nut or exteriorly-threaded collar H, engaging threads on said depressed portion and provided with notches $h$ (see Figs. 1 and 2) for the engagement of a spanner-wrench, serves as a means for forcing the cone-piece G upon the ball to clamp the same with the desired amount of pressure. A spring consisting of a bent or spring washer I is preferably interposed between the cone-piece and the adjusting-nut and exerts a spring-pressure upon the ball for the purpose of yieldingly holding the pad in any position to which it may be adjusted, while leaving it free to be moved in any direction when pressure is applied to it. By screwing the adjusting-nuts H in or out any desired frictional pressure may be brought to bear upon the balls C'.

The pads, it will be seen, are supported by their carriers in pairs upon opposite ends of the supporting-bar, that each pair of pads is adapted to be independently rocked transversely of the supporting-bar about a pivot extending parallel with the length of said bar, and that each pad may be independently rocked on its carrier in any direction. It will further be noted that the axis of the ball-and-socket joint between each pad and its carrier is located inside of the pad substantially midway between its front and back surfaces and centrally thereof, thus bringing said joint near the upholstered surface of the head-rest for a purpose farther on to be explained.

In order to enable the head-rest proper to be adjusted laterally relatively to its support and to the chair-back, the supporting-bar is formed on the lower edge with a dovetail guide rib or projection $B^2$, adapted to have sliding connection with a transverse guideway-groove $O^2$ in a cross-piece $O^3$ on the top of the supporting-arm O of the support for the head-rest.

A set-screw $o$ in the cross-piece $O^3$ may be employed for locking the head-rest-supporting bar in any lateral position to which it may be adjusted. The transverse movement of the head-rest may be limited in opposite directions by the ends $b^2$ of a groove $b^3$ coming in contact with a lug formed by a screw $o^3$ on the cross-piece $O^3$.

The support for the head-rest proper consists of an arm O, curved throughout its length in a line with the front and back of the chair and hinged or pivoted at its lower end to a slide P by means of a pivot Q. The slide P is provided on its opposite sides with longitudinal guide-grooves $p\ p$, adapted to slide upon tongues or guide-ribs $r\ r$ of a back-pad carrier R, whereby the slide has vertically-sliding connection with the said back-pad carrier. The slide P is cut away at P' from its upper end to the shoulder $p^2$ for the purpose of exposing the outer surfaces of the guide-ribs $r\ r$ of the back-pad carrier, and a clamp-piece S is fitted upon the cut-away portion of the slide, with its lower edge resting upon the shoulder $p^2$. Portions S' S' of the clamp-piece are adapted to bear upon the exposed surfaces of the guide-ribs $r\ r$, and dowel-pins $s\ s$ on said clamp-piece, engaging sockets in the slide, serve to prevent endwise and sidewise movement of the clamp-piece relatively to the slide, while permitting it to play in and out or toward and away from said slide. Upon the outer surfaces of the portions S' S' of the clamp-piece are sectors $S^2$ $S^2$, adapted to be borne upon by a pair of brake shoes or blocks T T, having curved inner faces corresponding with the curvature of the sectors $S^2$ $S^2$, upon which they are adapted to move in the arc of a circle about the pivot Q. The brake shoes or blocks are preferably connected by a pivot-pin T', whereby they may rock independently of each other. The short arm of a clamping-lever U, which is pivoted by a bolt U' to the supporting-arm near the lower end thereof, bears upon the brake-shoes T T, and a lug or lugs $u$ on the clamping-lever, engaging recesses $t\ t$ on the brake-shoes, prevents them from falling out of place, while leaving them free to be moved in or out relatively to the sectors $S^2$ $S^2$. A screw V, provided with a handle or knob V' and working in a threaded opening in the upper end of the long arm $U^2$ of the clamping-lever, bears at its inner end upon a cross-piece O' of the supporting-arm. By screwing the screw V inward the clamping-lever is rocked to force the brake-shoes upon the sectors $S^2$ $S^2$ of the clamp-piece S and said clamp-piece upon the guide-ribs $r\ r$ of the back-pad carrier. In this way the slide P may be firmly locked to the back-pad carrier in any position to which it may be vertically adjusted thereon and the supporting-arm firmly locked to said slide in any position to which it may be rocked by the manipulation of a single clamp-screw. By unscrewing this screw the slide P may be freely moved up and down upon the back-pad carrier from one end thereof to the other and the supporting-arm freely rocked toward and away from the chair-back.

In order to increase the frictional clamping action between the brake-shoes and the sectors, the contacting surfaces of said parts are grooved or provided with alternate V-shaped grooves and ribs extending in the direction of movement of said brake-shoes, or, if preferred, the surfaces of these parts may be of any suitable character. The upward movement of the slide P is limited by a small lug formed by a screw $p'$ on the side of the slide coming in contact with a lug formed by a screw $o'$ on the back-pad carrier.

The screw W and handle or knob W' are for clamping the back-pad carrier in its position of vertical adjustment, and the pivoted detent X is for adjusting the back pad X' to and from its carrier, the back pad being hinged to the top of the carrier at Z. As these parts relate to the back pad and its carrier and form no part of my present invention, detailed description of them is unnecessary.

From the above description it will be seen that with a head-rest support constructed according to my invention the head-rest is susceptible of a very wide range of adjustment, the support being vertically adjustable practically the entire length of the chair-back and capable of being rocked in the arc of a circle in a line from front to rear of the chair about a vertically-adjustable hinge or pivot, and that the extent of this rocking movement from front to rear is very great, whereby the head-rest may occupy an extreme forward position, as shown in Fig. 3 and also in dotted lines, Fig. 1, a rearward position, as shown in dotted lines, Fig. 1, or it may occupy a position low down, in which it rests upon the top of the back pad, as shown in full lines, Fig. 1. Obviously the head-rest may be caused to assume a great variety of intermediate positions to suit the convenience and comfort of patients seated in the chair to which the head-rest may be attached.

It will further be seen that the head-rest proper is practically self-adjusting or automatic in accommodating itself to any size and shape of head, the pads yielding to accommodate themselves to varying conditions and firmly supporting the head the instant the correct position has been attained. In practice it is only necessary to loosen the clamp-screw V to unlock the support, which may then be moved up or down and swung forwardly or rearwardly to bring the head-rest to the proper position, and then firmly locked in position by simply tightening the single clamp-screw. The pads will then take care of themselves and assume the necessary positions for affording the proper support to the patient's head without the manipulation of any clamps, screws, or other locking devices for the head-rest proper. This self-adjustment is attained by the hereinbefore-described peculiar construction of the head-rest proper, it being understood that as a pad on one end of each carrier is moved in any given direction by the patient's head the pad on the opposite end of the carrier is moved to compensate for the movement of the first-mentioned pad until both pads of the carrier come in contact with the head, when the pair of pads is arrested from further movement and the head firmly supported. It will also be understood that as each pad is independently and universally connected to its carrier and the ball-and-socket connection inside of the pad and near its upholstered surface each pad will yield when the head comes in contact with any point of it until the opposite ends or four corners of the pad come in contact with the head, when all movement of the pads ceases. After the pads have been moved until their entire surfaces, or at least their ends or corners, according to the shape of the pads, are brought in contact with the head they cannot be moved farther by the head no matter how much pressure is brought to bear upon them. This is true until the head is turned in any direction, when the pads immediately yield, as before described, to accommodate themselves to the new position of the head.

When the dentist desires to bring the patient's head to one side or other of the chair and nearer to or farther away from him, he has but to loosen the set-screw $o$ and move the head-rest proper to the desired position, after which the set-screw may be tightened, although this is not necessary. With the exception of this lateral adjustment of the head-rest proper the head-rest and its supporting-arm have no lateral adjustment or movement sidewise of the chair.

In Fig. 13 I have shown my improved head-rest proper provided with an operator's arm-rest, consisting of a pad K, swiveled upon a rod K', adapted to fit in a socket in one branch of the head-rest-supporting bar and held therein by a set-screw $k$.

In Figs. 14 and 15 I have shown a modification of the head-rest-supporting bar, which is provided with a ball L instead of with the dovetail guide-rib $B^2$, before described. This ball adapts the head-rest proper to be attached to its support by means of a ball-and-socket connection—such, for instance, as shown in United States Patent No. 197,441, granted November 20, 1877, to B. M. Wilkerson.

It will be obvious that my improved head-rest proper may be used upon supports other than the one herein shown and described and constructed in any suitable manner, and that my improved head-rest support may be employed for supporting head-rests proper of any suitable character. It will likewise be obvious that many changes and modifications both in the head-rest proper and its support may be made without departing from my invention. I therefore wish it to be understood that my present invention is not confined to the particular details of construction herein shown and described.

I claim as my invention—

1. The combination in a head-rest, of a supporting-bar, four pads arranged in pairs and each pad independently connected to said supporting-bar, and the pivotal connections between said pads and said supporting-bar, substantially as and for the purpose hereinbefore set forth.

2. The combination, in a head-rest, of a supporting-bar, the branches thereof, carriers pivoted to said branches and extending on opposite sides of the supporting-bar, the pair of pads connected to each carrier, and the ball-and-socket joints between said pads and the carriers, substantially as and for the purpose hereinbefore set forth.

3. The combination, in a head-rest, of a supporting-bar, the branches thereof, carriers having pivotal connection one with each branch of the supporting-bar, the axis of the respective pivots of the carriers being in alinement with each other and parallel with the longitudinal axis of the supporting-bar, and the pair of pads supported by each carrier, substantially as and for the purpose hereinbefore set forth.

4. The combination, in a head-rest, of a supporting-bar, the branches thereof, a carrier centrally pivoted to each branch on a pivot that extends parallel with the longitudinal axis of the supporting-bar, the opposite ends of each carrier being bent or curved inwardly to extend substantially parallel with the said pivot and terminating in balls, the head-rest pads each provided with a socket in which is seated one of the balls of the carriers, substantially as and for the purpose hereinbefore set forth.

5. The combination, in a head-rest, of the pads, a supporting-bar therefor, a ball-and-socket joint between each pad and the supporting-bar, the axis of the ball-and-socket joint for each pad being located inside of the pad substantially midway between its front and back surfaces and centrally thereof, substantially as and for the purpose hereinbefore set forth.

6. The combination, in a head-rest, of a supporting-arm curved throughout its length in a line with the front and back of a dental chair, and hinged to a chair-back below the top thereof and adapted to move only in a direction in a line with the front and back of said chair and vertically, means for locking said arm in any position to which it may be adjusted, and a head-rest carried at the upper end of said arm, substantially as and for the purpose hereinbefore set forth.

7. The combination, in a head-rest, of a slide having vertically-adjustable sliding connection with a chair-back, a curved supporting-arm hinged to said slide below the top of said chair-back, means for locking said supporting-arm in any position to which it may be adjusted, and a head-rest carried at the upper end of said arm, substantially as and for the purposes hereinbefore set forth.

8. The combination, in a head-rest, of a slide having vertically-adjustable connection with a chair-back, a support pivoted to said slide, a single locking device for simultaneously locking the vertically-adjustable slide and the pivoted support in their positions of adjustment, and a head-rest proper carried at the upper end of the support and consisting of self-adjusting pads, whereby the head-rest may be adjusted to and locked in any desired position by the manipulation of but a single locking device, substantially as described.

9. The combination, in a head-rest, of a slide having vertically-adjustable connection with a chair-back, a supporting-arm pivoted to said slide, a head-rest proper carried by said supporting-arm, a clamp-piece mounted upon said slide and provided with a sector, a brake-shoe bearing upon said sector, a clamping-lever pivoted upon said supporting-arm and bearing upon said brake-shoe, and means for operating said clamping-lever, whereby it may be actuated to simultaneously lock the slide in any vertical position to which it may be adjusted and the supporting-arm in any position to which it may be rocked on its pivotal connection with said slide, substantially as set forth.

In testimony whereof I affix my signature in presence of two witnesses.

ARTHUR W. BROWNE.

Witnesses:
 GEO. D. HECK,
 SEYMOUR CASE.